UNITED STATES PATENT OFFICE.

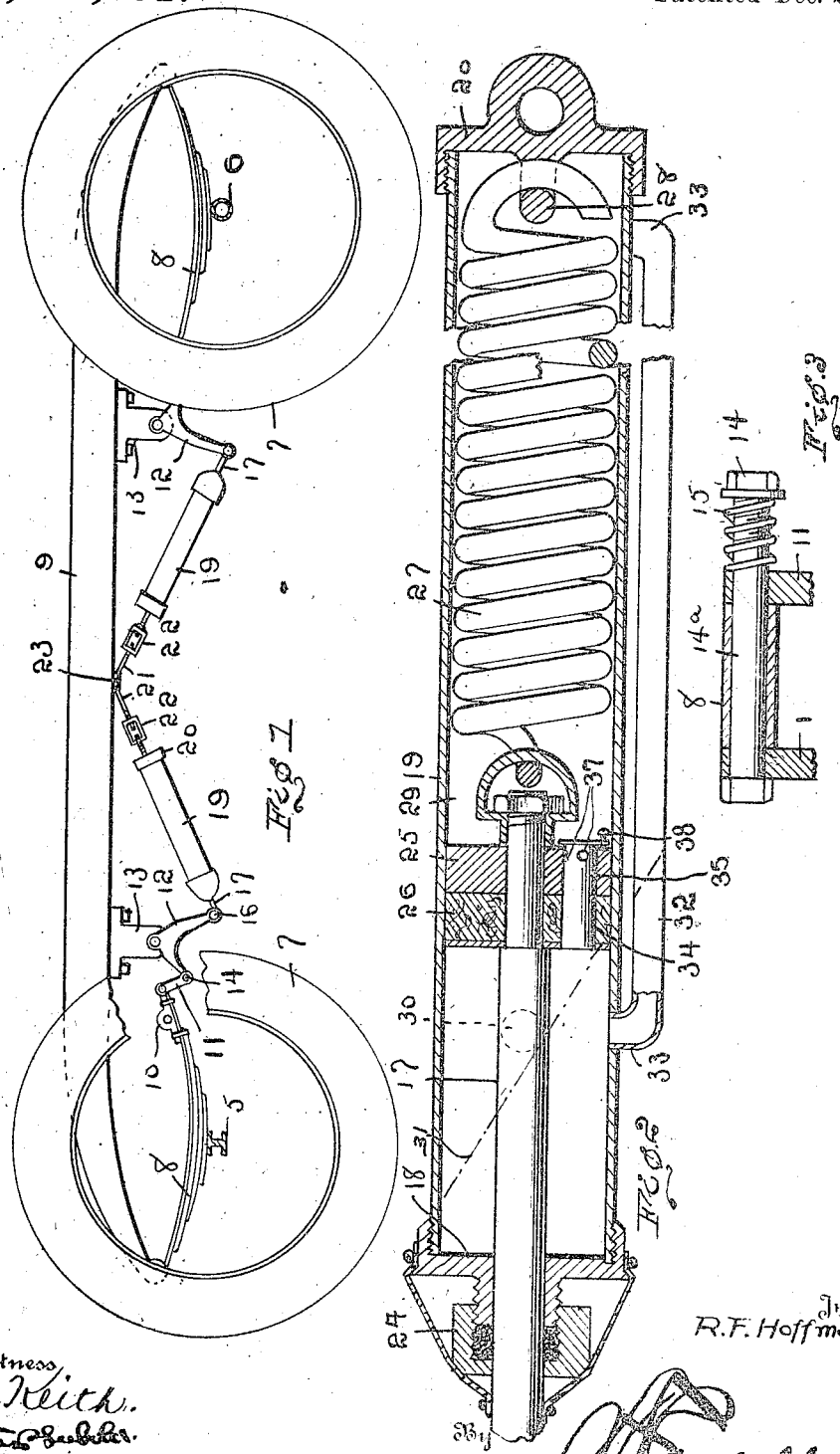

REUBEN F. HOFFMAN, OF HAMILTON, OHIO.

SHOCK-ABSORBER.

1,288,891.

Specification of Letters Patent.   Patented Dec. 24, 1918.

Application filed November 24, 1916.   Serial No. 133,136.

*To all whom it may concern:*

Be it known that I, REUBEN F. HOFFMAN, a citizen of the United States, residing at Hamilton, in the county of Butler and State of Ohio, have invented certain new and useful Improvements in Shock-Absorbers; and I do hereby declare the following to be a full, clear, and exact description of the invention, such as will enable others skilled in the art to which it appertains to make and use the same.

This invention has for its object to provide an improved shock absorber, particularly designed for use in connection with motor vehicles for effectively cushioning or absorbing the movement of the body of the vehicle incident to travel over rough roads.

Another object is the provision of an improved shock absorber connecting one terminal of each semi-elliptical supporting spring with the vehicle frame and embodying means for effectively absorbing the recoil movement of the frame.

Another object is the provision of means for maintaining the parts of the shock absorber in lubricated condition.

With these and other objects in view, the invention consists in the novel construction, combination and arrangement of parts as will be hereinafter specifically described, claimed and illustrated in the accompanying drawing, in which:

Figure 1 represents a fragmental side elevation of a vehicle, illustrating the improved shock absorber applied thereto, Fig. 2 represents a longitudinal sectional view through the cylinder containing the shock absorbing spring, and Fig. 3 represents a detail sectional view, partly broken away, through the spring and shackles.

Referring to the drawing in detail, wherein similar reference numerals designate corresponding parts throughout the several views, the numerals 5 and 6 indicate the front and rear axles, respectively, which are supported upon the wheels 7. Semi-elliptical leaf springs 8 are fastened centrally upon the axles 5 and 6 and support the vehicle frame 9 at the opposite ends of the latter.

A rubber bumper 10 is fastened adjacent the inner end of each spring 8 and the latter is connected by shackles, or links, 11 with one arm of a bell crank 12, which latter is pivotally secured to a depending support 13 carried by the frame 9.

The bolts 14 connecting the shackles 11 with the spring 8 and bell crank 12 and also the bolt 14ª connecting the bell crank 12 with the supporting member 13 are received within coil springs 15, which engage at one end with the heads of the bolts and at their opposite ends with the adjacent portion of the shackles and bell crank and prevent loose movement of the parts.

The other arm of each bell crank 12 is pivotally connected at 16 with a piston rod 17, which extends through the head 18 in the adjacent end of the inclined cylinder 19. The head 20 at the opposite end of the cylinder is pivotally connected with a sectional rod 21, having the adjacent terminals of the sections threaded and connected by a turnbuckle 22, whereby the length of the rod may be varied, as desired. The end of the section opposite the cylinder 19 is pivotally connected at 23, adjacent the longitudinal center of the longitudinal member of the vehicle frame 9.

The piston rod 17 extends through a packing gland 24 and is connected with a piston head 25 slidably mounted in the cylinder 19. An annular cushioning element 26 constructed of felt or other resilient material is fastened to the under side of the piston 25, and is adapted, during the downward movement of the piston, to engage the head 18 and thus yieldably limit the movement of the piston in the cylinder.

A spring 27 is connected at one end with an apertured extension or ear 28 formed on the upper cylinder head 20, and is connected at its opposite end with a ring 29 fastened to the piston 25. The spring 27 is designed to resist the downward movement of the piston 25 within the cylinder.

The lower portion of the cylinder 19 is formed with a filling opening in which is fitted a cap or plug 30, whereby the cylinder may be partially filled with a suitable lubricant 31, which is designed to lubricate and insure free movement of the piston 17 and head 25. An oil pipe 32 is connected at its opposite angularly directed ends 33 with the upper and lower portions of the cylinder, the lower end of the pipe 32 communicating with the interior of the cylinder at a point below the surface of the lubricant 31, whereby the lubricant is conducted to the upper portion of the cylinder to lubricate the latter.

The piston 25 and cushioning member 26 are formed with alined ports 34, in which is arranged a hollow cylindrical gravity closing valve 35, having ports 37 adjacent one end designed to allow the lubricant to pass by the piston during the downward movement of the latter within the cylinder. The valve 35 is provided with a screw 38, whereby the closing movement thereof may be stopped at various points and the downward flow of oil through the ports 37 controlled.

During travel of the vehicle over an ordinary road the downward movement of the frame with relation to the axles is yieldably retarded or absorbed by the springs 8 and 27. During the reciprocatory movement of the piston 25 in the cylinder the lubricant 31 is effectively distributed over the entire inner or working surface of the cylinder and lubricates the parts of the shock absorber arranged therein. In traversing extremely rough roads the piston head 25 frequently moves to the extreme lower end of the cylinder 19 and consequently the cushioning member 26 is provided to yieldably limit the downward movement thereof. During the long down stroke of the piston, the valve 35 is automatically opened, thus permitting the oil or other fluid 31 to freely pass to the portion of the cylinder 19 above the piston. As the piston moves upwardly to its initial position, the closing movement of the valve 35 is stopped by the screw 38 and the slow passage of the oil through the partially closed ports 37 retards the upward movement of the piston.

What I claim is:

1. In a shock absorber, a cylinder, a piston reciprocably mounted in said cylinder having a by-pass port therein, a normally closed check valve arranged in said port, a pipe connecting the opposite extremities of said cylinder, and a spring connected at one end with one end of said cylinder and at the opposite end with said piston.

2. In a shock absorber, a cylinder, a piston rod slidably mounted in one end of said cylinder, a piston head carried by said rod, a cushioning member carried by said piston and movable against one end of said cylinder, a pipe connecting the opposite extremities of said cylinder, and means normally retaining said piston head in predetermined position in said cylinder.

In testimony whereof I affix my signature in presence of two witnesses.

REUBEN F. HOFFMAN.

Witnesses:
CLINTON EGBERT,
THAD J. HOFFMAN.